United States Patent
Chen et al.

(10) Patent No.: US 11,055,457 B1
(45) Date of Patent: Jul. 6, 2021

(54) PAD RING GENERATION FOR INTEGRATED CIRCUITS

(71) Applicant: SiFive, Inc., San Mateo, CA (US)

(72) Inventors: Han Chen, Cupertino, CA (US); John Drummond, San Francisco, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

(21) Appl. No.: 16/849,533

(22) Filed: Apr. 15, 2020

(51) Int. Cl.
*G06F 30/327* (2020.01)
*G06F 9/30* (2018.01)
*G06F 30/373* (2020.01)
*G06F 30/343* (2020.01)

(52) U.S. Cl.
CPC ........ *G06F 30/327* (2020.01); *G06F 9/30098* (2013.01); *G06F 30/343* (2020.01); *G06F 30/373* (2020.01)

(58) Field of Classification Search
CPC .. G06F 30/327; G06F 30/373; G06F 9/30098; G06F 30/34; G06F 30/392
See application file for complete search history.

(56) References Cited

U.S. PATENT DOCUMENTS

| | | | |
|---|---|---|---|
| 6,956,283 B1* | 10/2005 | Peterson | B81B 7/0025 257/680 |
| 7,017,137 B2* | 3/2006 | Wadland | G06F 30/394 716/112 |
| 7,020,852 B2* | 3/2006 | Oeltjen | G01R 31/318314 716/136 |
| 7,549,135 B2* | 6/2009 | Chapman | G06F 30/398 716/135 |
| 7,627,838 B2* | 12/2009 | Keswick | G06F 30/39 716/132 |
| 7,657,858 B2* | 2/2010 | Chen | G06F 30/392 716/120 |

(Continued)

OTHER PUBLICATIONS

Huang et al.; "Analysis of Warpage and Stress Behavior in a Fine Pitch Multi-Chip Interconnection with Ultrafine-Line Organic Substrate (2.1 D)"; 2018 IEEE 68th Electronic Components and Technology Conference (ECTC); Conference Paper | Publisher: IEEE (Year: 2018).*

(Continued)

*Primary Examiner* — Helen Rossoshek
(74) *Attorney, Agent, or Firm* — Young Basile Hanlon & MacFarlane, P.C.

(57) ABSTRACT

Systems and methods are disclosed for pad ring generation for integrated circuits. For example, a method may include accessing a pad ring configuration data structure, wherein the pad ring configuration data structure declares rules for inputs and outputs of an integrated circuit using a scripting language; based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring; and transmitting, storing, or displaying the integrated circuit design data structure.

20 Claims, 7 Drawing Sheets

(56) References Cited

U.S. PATENT DOCUMENTS

| | | | | |
|---|---|---|---|---|
| 7,669,155 | B2* | 2/2010 | Ganesan | G06F 30/3312 |
| | | | | 716/100 |
| 8,166,437 | B2* | 4/2012 | Chen | G06F 30/34 |
| | | | | 716/117 |
| 8,365,123 | B2* | 1/2013 | Chen | G06F 30/34 |
| | | | | 716/116 |
| 8,479,135 | B2* | 7/2013 | Chen | G06F 30/34 |
| | | | | 716/117 |
| 2014/0167818 | A1* | 6/2014 | Eisenstadt | H01L 23/5225 |
| | | | | 326/101 |
| 2018/0150580 | A1* | 5/2018 | James | G06F 30/30 |
| 2020/0151368 | A1* | 5/2020 | Bush | G06F 21/87 |
| 2020/0242277 | A1* | 7/2020 | James | G06F 30/00 |

OTHER PUBLICATIONS

Chong et al.; "Unified Padring Design Flow—New Developments and Results"; IEEE Conference Publication; 2013 1st International Conference on Sritcial Intelligence, Modelling and Simulation; Dec. 2013; 3 pages; https://ieeexplore.ieee.org/document/6959962.

He et al.; "Introduction to Chip-Package Co-design"; International Symposium on Quality Electronic Design; 2005; 46 pages.

Hogan et al.; "LEF/DEF 10 Ring Check Automation"; Design with Calibre; Posted on Dec. 15, 2015 by Design With Calibre; 11 pages; https://blogs.mentor.com/calibre/blog/2015/12/15/lefdef-io-ring-check-automation/.

Teman et al.; Digital VLSI Design; Lecture 9: I/O and Pad Ring; Semester A, 2016-17; Emerging Nanoscaled Integrated Circuits and Systems Labs; Bar-Ilan University, 19 pages.

* cited by examiner

PAD RING GENERATION FOR INTEGRATED CIRCUITS

TECHNICAL FIELD

This disclosure relates to pad ring generation for integrated circuits.

BACKGROUND

Integrated circuits are typically designed and tested in a multi-step process that involves multiple specialized engineers performing a variety of different design and verification tasks on an integrated circuit design. A variety of internal or proprietary (e.g., company-specific) integrated circuit design tool chains are typically used by these engineers to handle different parts of the integrated circuit design workflow of using commercial electronic design automation (EDA) tools.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
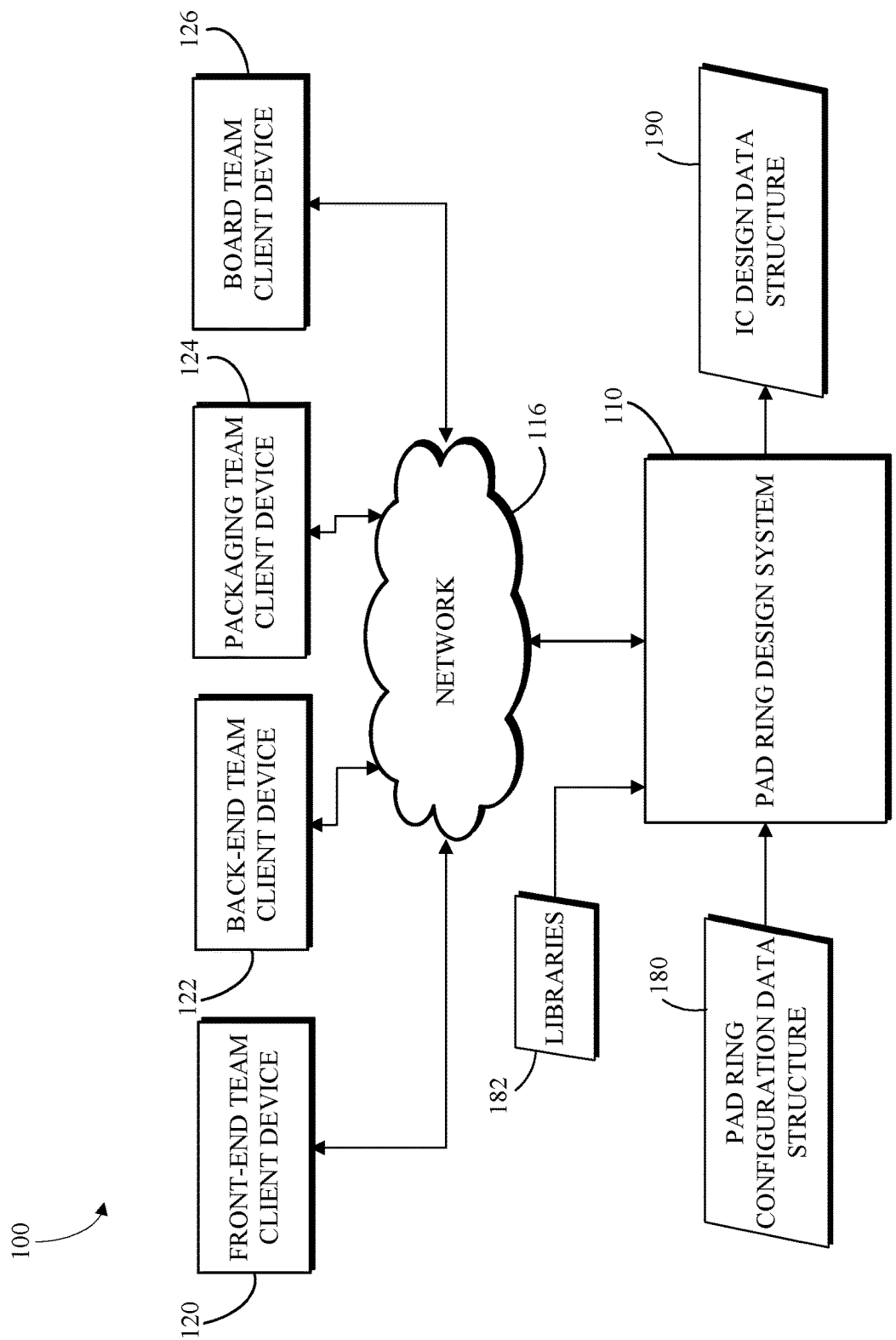
FIG. 1 is a block diagram of an example of a system for facilitating design of integrated circuits including a pad ring.

Systems and methods for pad ring generation for integrated circuits (e.g., microprocessors) are disclosed. The pad ring (e.g., a chip wrapper) is a *nexus* of dependency in an integrated circuit design flow. Techniques are described herein for generating a pad ring for an integrated circuit design early in an integrated circuit design flow and efficiently sharing access to the pad ring design among team members with varied expertise and training. An interface using a widely used scripting language (e.g., the tool control language Tcl) is provided to facilitate rapid modular pad ring generation, which may include the incorporation of standard building blocks called PHY blocks or mixed signal IPs. These systems may provide different chip-level views of a pad ring design to various team members in an integrated circuit design flow, including a chip-level logical view and chip-level physical design. These techniques may enable logic of an integrated circuit to continue to be generated and modified after the pad ring is established, which may enable the performance of other design flow steps (e.g., package design and board design) in parallel with continued development of the core logic of an integrated circuit design.

The systems and methods described herein may provide one or more advantages over conventional systems for integrated circuit design, such as, for example, providing a simplified interface using a standard scripting language (e.g., the tool control language, Tcl) for generating a pad ring design for an integrated circuit early in an integrated circuit design flow, enhancing sharing of access to a pad ring design by multiple stake holders in an integrated circuit design flow who have training with different sets of electronic design automation tools, and/or enabling greater parallelism in an integrated circuit design flow to decrease design iteration time.

In a first aspect, the subject matter described in this specification can be embodied in systems that include a memory; and a processor, wherein the memory includes instructions executable by the processor to cause the system to: access a pad ring configuration data structure, wherein the pad ring configuration data structure declares rules for inputs and outputs of an integrated circuit using a scripting language; and, based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring.

In a second aspect, the subject matter described in this specification can be embodied in methods that include accessing a pad ring configuration data structure, wherein the pad ring configuration data structure declares rules for inputs and outputs of an integrated circuit using a scripting language; based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring; and transmitting, storing, or displaying the integrated circuit design data structure.

In a third aspect, the subject matter described in this specification can be embodied in a non-transitory computer-readable storage medium that includes instructions that, when executed by a processor, facilitate performance of operations comprising: accessing a pad ring configuration data structure, wherein the pad ring configuration data structure declares rules for inputs and outputs of an integrated circuit using a scripting language; based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring; and transmitting, storing, or displaying the integrated circuit design data structure.

FIG. 1 is a block diagram of an example of a system 100 for facilitating design of integrated circuits including a pad ring. The system 100 includes a pad ring design system 110 that processes requests received from client devices used by various members of an integrated circuit design team via communications over a network 116. In this example, the client devices include a front-end team client device 120, a back-end team client device 122, a packaging team client device 124, and a board team client device 126. For example, the pad ring design system 110 may take a pad ring configuration data structure 180 (e.g., encoded as Tcl file) as input, and may output an integrated circuit design data structure 190 that specifies a pad ring design for an integrated circuit with a physical view and a logical view of the pad ring design. The pad ring design system 110 may also access one or more libraries 182 (e.g., a library exchange format file (LEF) or a Liberty file (LIB)) that may be referenced by the pad ring configuration data structure 180 and on which the integrated circuit design data structure 190 may depend. The pad ring design system 110 may provide one or more interfaces through these client devices to facilitate the sharing of information about a pad ring design that is used by team members with different roles in an integrated circuit design flow to enable greater parallelism of design tasks and thus shorter development cycles.

The pad ring design system 110 is configured to take a pad ring configuration data structure 180 as input. The pad ring configuration data structure 180 may specify parameters of a pad ring for an integrated circuit design, such as a set of input/output pads to be included in the pad ring. For example, the pad ring configuration data structure 180 may be encoded as a file in the Tcl language. For example, the pad ring configuration data structure 180 may include Tcl language code of Appendix A. The pad ring design system 110 may be configured to generate an integrated circuit design data structure 190 based on the pad ring configuration data structure 180. The integrated circuit design data structure 190 may include register-transfer logic files and/or a bump coordinate file for an integrated circuit design. For example, the integrated circuit design data structure 190 may be the integrated circuit design data structure 210 of FIG. 2. In some implementations, the pad ring design system 110 may return a generated integrated circuit design data structure 190 as a repository (e.g. GitHub repository). For example, a generated design data structure may be transmitted to or stored by the pad ring design system 110 to a GitHub repository and access credentials for the GitHub repository may be delivered (e.g., via a web interface) to the client devices (120, 122, 124, and 126). For example, the pad ring design system 110 may implement the process 500 of FIG. 5. For example, the pad ring design system 110 may implement the process 600 of FIG. 6. For example, the pad ring design system 110 may implement the process 700 of FIG. 7. For example, the pad ring design system 110 may be implemented as software running on the system 300 of FIG. 3. For example, the pad ring design system 110 may be implemented as cloud service.

For example, the client devices (120, 122, 124, and 126) may be personal computing devices (e.g., desktops, laptops, or tablets) used by members of respective integrated circuit design teams that use the pad ring design system 110 to collaborate more efficiently. For example, the client devices (120, 122, 124, and 126) may be configured with tools for performing various task in an integrated circuit design flow, some of which may have dependencies on aspects of a pad ring design for an integrated circuit. The client devices (120, 122, 124, and 126) may access the pad ring design system 110 via the network 116. For example, the network 116 may be a local area network (e.g., a WiFi network) or a wide array network (e.g., the Internet).

Figure 2:
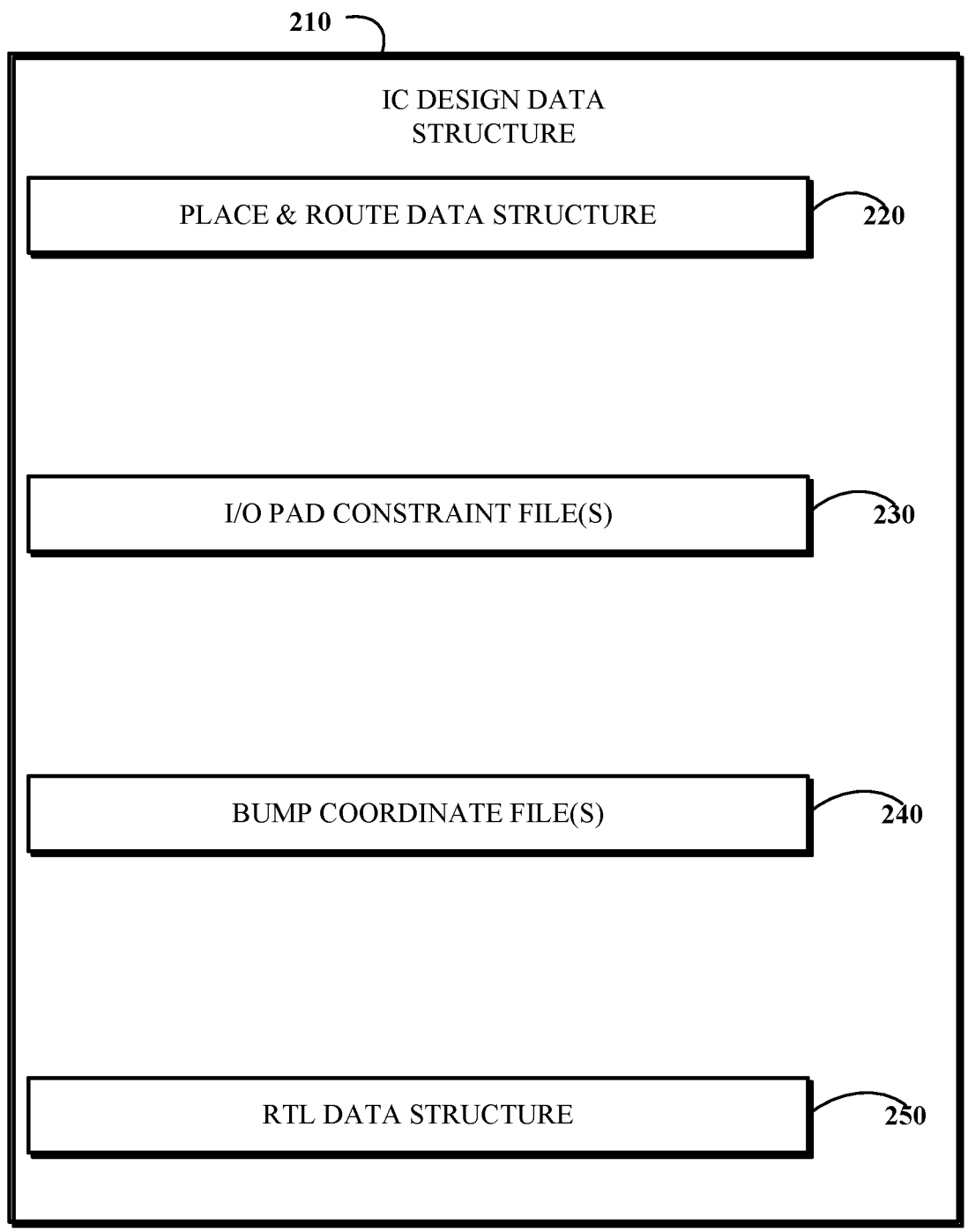
FIG. 2 is a memory map of an example of an integrated circuit design data structure.

FIG. 2 is a memory map of an example of an integrated circuit design data structure 210. The integrated circuit design data structure 210 includes data describing various aspects of an integrated circuit design, including aspects of a logical design and aspects of a physical design. The integrated circuit design data structure 210 includes a place and route data structure 220; one or more input/output pad constraint files 230; a one or more bump coordinate files 240; and a register-transfer logic data structure 250.

The place and route data structure 220 includes data (e.g., in an ASCII format) describing aspects of the physical layout of various components of an integrated circuit including a pad ring. The place and route data structure 220 may include a netlist, component placements, and routing information. For example, the place and route data structure 220 may include a Design Exchange Format (DEF) file. The place and route data structure 220 may reference component library files (e.g., Library Exchange Format (LEF) files) that contain information on the used components.

The one or more input/output pad constraint files 230 include data describing constraints for input and output pads of an integrated circuit. For example, the one or more input/output pad constraint files 230 may encode design constraints for a pad ring in Tcl format.

The one or more bump coordinate files 240 include data describing the positions of bumps of an integrated circuit. For example, the one or more bump coordinate files 240 may be used by a package design team to design an interposer in an integrated circuit package substrate connecting the bumps to ball grid array (BGA) balls. For example, the one or more bump coordinate files 240 may include a bump netlist.

The register-transfer logic data structure 250 includes data describing a logical design of the integrated circuit. The register-transfer logic data structure 250 describes connections between one or more input/output drivers of a pad ring and other logic circuits of the integrated circuit. In some implementations, the register-transfer logic data structure 250 encodes connections between one or more input/output drivers of a pad ring and a placeholder for additional logic circuits. For example, the register-transfer logic data structure 250 may include one or more register-transfer logic (RTL) files.

Figure 3:
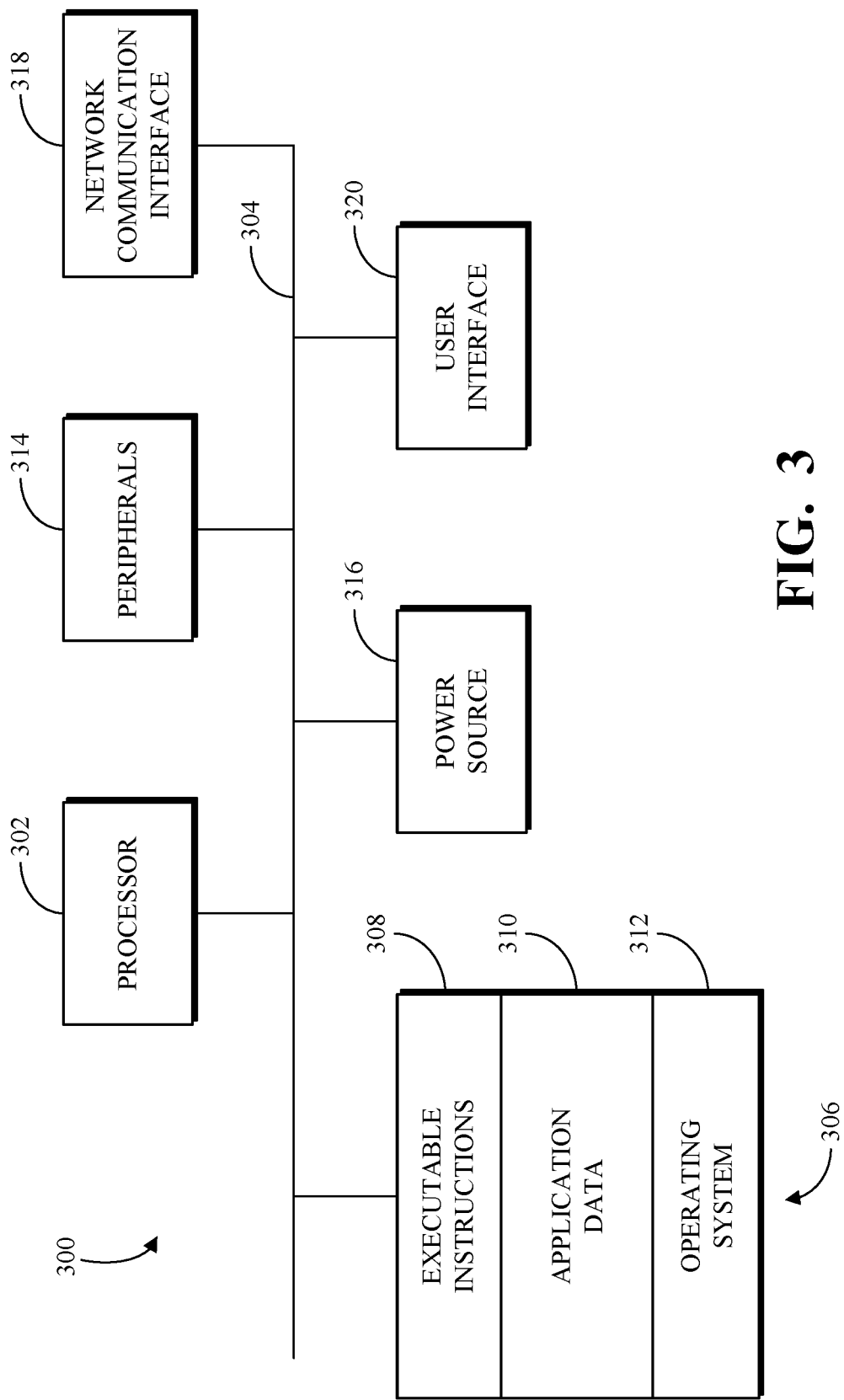
FIG. 3 is a block diagram of an example of a system for facilitating design of integrated circuits.

FIG. 3 is block diagram of an example of a system 300 for facilitating design of integrated circuits including a pad ring. The system 300 is an example of an internal configuration of a computing device that may be used to implement the pad ring design system 110 as a whole or one or more components of the pad ring design system 110 of the system 100 shown in FIG. 1. The system 300 can include components or units, such as a processor 302, a bus 304, a memory 306, peripherals 314, a power source 316, a network communication interface 318, a user interface 320, other suitable components, or a combination thereof.

The processor 302 can be a central processing unit (CPU), such as a microprocessor, and can include single or multiple processors having single or multiple processing cores. Alternatively, the processor 302 can include another type of device, or multiple devices, now existing or hereafter developed, capable of manipulating or processing information. For example, the processor 302 can include multiple processors interconnected in any manner, including hardwired or networked, including wirelessly networked. In some implementations, the operations of the processor 302 can be distributed across multiple physical devices or units that can be coupled directly or across a local area or other suitable type of network. In some implementations, the processor 302 can include a cache, or cache memory, for local storage of operating data or instructions.

The memory 306 can include volatile memory, non-volatile memory, or a combination thereof. For example, the memory 306 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 306 can include another type of device, or multiple devices, now existing or hereafter developed, capable of storing data or instructions for processing by the processor 302. The processor 302 can access or manipulate data in the memory 306 via the bus 304. Although shown as a single block in FIG. 3, the memory 306 can be implemented as multiple units. For example, a system 300 can include volatile memory, such as RAM, and persistent memory, such as a hard drive or other storage.

The memory 306 can include executable instructions 308, data, such as application data 310, an operating system 312, or a combination thereof, for immediate access by the processor 302. The executable instructions 308 can include, for example, one or more application programs, which can be loaded or copied, in whole or in part, from non-volatile memory to volatile memory to be executed by the processor 302. The executable instructions 308 can be organized into programmable modules or algorithms, functional programs, codes, code segments, or combinations thereof to perform various functions described herein. For example, the executable instructions 308 can include instructions executable by the processor 302 to cause the system 300 to implement the process 500 of FIG. 5, the process 600 of FIG. 6, or the process 700 of FIG. 7. The application data 310 can include, for example, user files, database catalogs or dictionaries, configuration information or functional programs, such as a web browser, a web server, a database server, or a combination thereof. The operating system 312 can be, for example, Microsoft Windows®, Mac OS X®, or Linux®, an operating system for a small device, such as a smartphone or tablet device; or an operating system for a large device, such as a mainframe computer. The memory 306 can comprise one or more devices and can utilize one or more types of storage, such as solid state or magnetic storage.

The peripherals 314 can be coupled to the processor 302 via the bus 304. The peripherals 314 can be sensors or detectors, or devices containing any number of sensors or detectors, which can monitor the system 300 itself or the environment around the system 300. For example, a system 300 can contain a geospatial location identification unit, such as a global positioning system (GPS) location unit. As another example, a system 300 can contain a temperature sensor for measuring temperatures of components of the system 300, such as the processor 302. Other sensors or detectors can be used with the system 300, as can be contemplated. In some implementations, the power source 316 can be a battery, and the system 300 can operate independently of an external power distribution system. Any of the components of the system 300, such as the peripherals 314 or the power source 316, can communicate with the processor 302 via the bus 304.

The network communication interface 318 can also be coupled to the processor 302 via the bus 304. In some implementations, the network communication interface 318 can comprise one or more transceivers. The network communication interface 318 can, for example, provide a connection or link to a network, such as the network 116, via a network interface, which can be a wired network interface, such as Ethernet, or a wireless network interface, such as WiFi. For example, the system 300 can communicate with other devices via the network communication interface 318 and the network interface using one or more network protocols, such as Ethernet, TCP, IP, power line communication (PLC), WiFi, infrared, GPRS, GSM, CDMA, or other suitable protocols.

A user interface 320 can include a display; a positional input device, such as a mouse, touchpad, touchscreen, or the like; a keyboard; or other suitable human or machine interface devices. The user interface 320 can be coupled to the processor 302 via the bus 304. Other interface devices that permit a user to program or otherwise use the system 300 can be provided in addition to or as an alternative to a display. In some implementations, the user interface 320 can include a display, which can be a liquid crystal display (LCD), a cathode-ray tube (CRT), a light emitting diode (LED) display (e.g., an OLED display), or other suitable display.

In some implementations, a client or server can omit the peripherals 314. The operations of the processor 302 can be distributed across multiple clients or servers, which can be coupled directly or across a local area or other suitable type of network. The memory 306 can be distributed across multiple clients or servers, such as network-based memory or memory in multiple clients or servers performing the operations of clients or servers. Although depicted here as a single bus, the bus 304 can be composed of multiple buses, which can be connected to one another through various bridges, controllers, or adapters.

Figure 4:
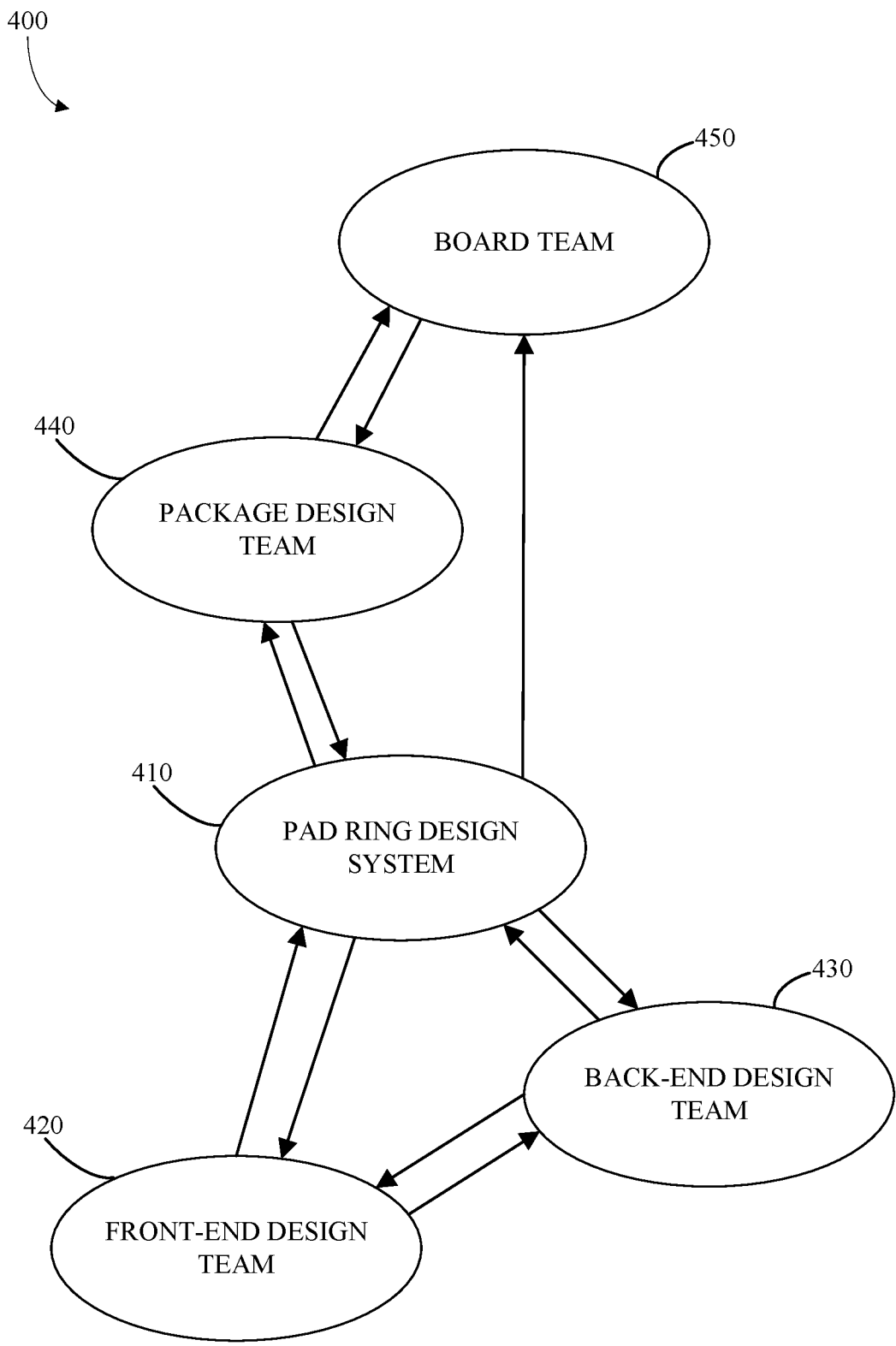
FIG. 4 is a diagram of an example of a workflow for designing an integrated circuit with a customized package and a reference circuit board design.

FIG. 4 is a diagram of an example of a workflow 400 for designing an integrated circuit with a customized package and a reference circuit board design. The workflow 400 includes a pad ring design system 410 (e.g., the pad ring design system 110 of FIG. 1) that enables the development and maintenance of a pad ring design for an integrated circuit and provides one or more interfaces to design teams of the workflow 400 to facilitate shared access to the pad ring design. The workflow 400 includes a front-end design team 420 that is primarily responsible for designing the logic of the integrated circuit, a back-end design team 430 that is primarily responsible for developing a physical design for the integrated circuit, a package design team 440 that is primarily responsible for developing a package design for the integrated circuit, and a board team 450 that is primarily responsible for developing a reference circuit board design for the integrated circuit. Each of these teams 420, 430, 440, and 450 is able to access the pad ring design of the integrated circuit via the pad ring design system 410 to resolve dependencies of their respective designs on the pad ring design. The pad ring design system 410 may enable the pad ring to be specified before the logical and physical design of the integrated circuit are complete. Since the pad ring is the interface between the integrated circuit and its package and ultimately its reference circuit board, allowing the pad ring to be specified before the integrated circuit design is complete, may enable parallelism of the design efforts of package design team 440 and the board team 450 with the design of the integrated circuit by the front-end team 420 and the back-end team 430, and thus expedite the design process as a whole.

Figure 5:
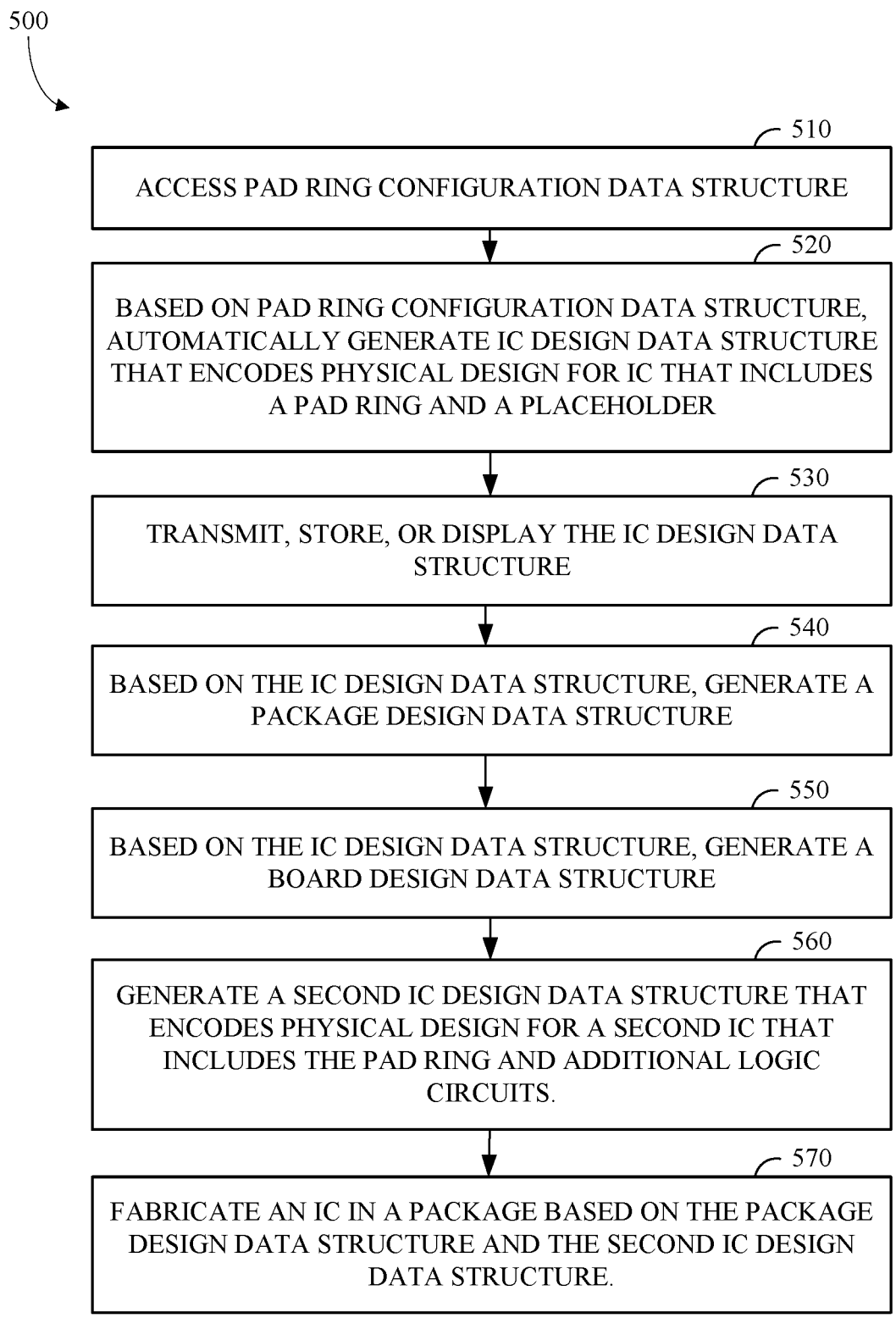
FIG. 5 is a flow chart of an example of a process for facilitating design of an integrated circuit including a pad ring with a customized package and a reference circuit board.

FIG. 5 is a flow chart of an example of a process 500 for facilitating design of an integrated circuit including a pad ring with a customized package and a reference circuit board. The process 500 includes accessing 510 a pad ring configuration data structure; based on the pad ring configuration data structure, automatically generating 520 an integrated circuit design data structure that encodes a physical design for an integrated circuit that includes a pad ring with bumps satisfying the rules for inputs and outputs of the integrated circuit and also includes a placeholder for additional logic circuits; transmitting, storing, or displaying 530 the integrated circuit design data structure; based on the integrated design data structure, generating 540 a package design data structure; based on the integrated design data structure, generating 550 a board design data structure; based on the pad ring configuration data structure and a register transfer level data structure describing additional logic circuits, generating 560 a second integrated circuit design data structure that encodes a physical design for a second integrated circuit that includes the pad ring with the bumps satisfying the rules for inputs and outputs of the integrated circuit and the additional logic circuits that use the connections to the one or more input drivers of the pad ring and to the one or more output drivers of the pad ring; and fabricating 570 an integrated circuit in a package based on the package design data structure and the second integrated circuit design data structure. For example, the process 500 may be implemented using the pad ring design system 110 of FIG. 1. For example, the process 500 may be implemented using the system 300 of FIG. 3.

The process 500 includes accessing 510 a pad ring configuration data structure (e.g., a file, a database, a repository, or a bitstream). The pad ring configuration data structure declares rules for inputs and outputs of an integrated circuit using a scripting language. In some implementations, the pad ring configuration data structure is encoded in a tool control language (e.g., the Tcl scripting language). For example, the pad ring configuration data structure may include the code of Appendix A. For example, the pad ring configuration data structure may be accessed 510 by receiving the pad ring configuration data structure (e.g., via network communications with a client device, such as the front-end team client device 120 or the back-end team client device 122, using the network communications interface 318). For example, the pad ring configuration data structure may be accessed 510 by reading the pad ring configuration data structure (e.g., reading from the memory 306 via the bus 304).

The process 500 includes, based on the pad ring configuration data structure, automatically generating 520 an integrated circuit design data structure that encodes a physical design for the integrated circuit that includes a pad ring with bumps satisfying the rules for inputs and outputs of the integrated circuit and also includes a placeholder for additional logic circuits. The placeholder includes connections to one or more input drivers of the pad ring and to one or more output drivers of the pad ring. In some implementations, the pad ring includes a redistribution layer that connects the bumps to the one or more input drivers of the pad ring and to the one or more output drivers of the pad ring. The integrated circuit design data structure may include a chip-level register-transfer logic (RTL) module including the pad ring (e.g., a chip wrapper). For example, the pad ring may include i/o drivers (e.g., buffers or repeaters), bumps (e.g., C4 (controlled-collapse chip connection)), a redistribution layer (RDL) connecting the bumps to the i/o drivers, and/or electrostatic discharge (ESD) diode clamps. In some implementations, the integrated circuit design data structure (e.g., including a register-transfer level file) may be automatically generated 520 based on the pad ring configuration data structure using tools, such as Scala, Chisel, Diplomacy, and/or FIRRTL. For example, generating 520 the integrated circuit design data structure for the integrated circuit may include executing Scala code to read design parameters from the pad ring configuration data structure and/or libraries referenced therein and dynamically generate a circuit graph. In some implementations, generating 520 the integrated circuit design data structure for the integrated circuit includes invoking a Diplomacy package in Chisel to determine a bus protocol for the integrated circuit. In some implementations, the integrated circuit design data structure encodes an integrated circuit including standard interface circuits (e.g., USB, DDR, PCI bus, HDMI, or Ethernet) sometimes called PHY blocks or mixed signal IPs. For example, the integrated circuit may include a PHY block connected to one or more of the bumps. The PHY block may be identified by the pad ring configuration data structure.

The integrated circuit design data structure includes a register-transfer level data structure for the integrated circuit. The integrated circuit design data structure may include a place and route data structure for the integrated circuit. The integrated circuit design data structure may include a bump coordinate file for the integrated circuit. The integrated circuit design data structure may include input/output pad constraint files for the integrated circuit. For example, the integrated circuit design data structure may be the integrated circuit data structure 210 of FIG. 2.

The integrated circuit design data structure may encode a logical design of the integrated circuit (e.g., including one or more register-transfer logic files) and/or a physical design of the integrated circuit (e.g., including one or more GDSII files). In some implementations, the integrated circuit design data structure may be presented in one more views tailored to a type of user (e.g., a front-end team user, a back-end team user, or a package team user), such as in a logical view of the integrated circuit design and/or a physical view of the integrated circuit design. For example, the process 700 of FIG. 7 may be implemented to present the integrated circuit design data.

The process 500 includes transmitting, storing, or displaying 530 the integrated circuit design data structure. For example, the integrated circuit design data structure may be a collection of files, an archive, or a repository (e.g., a GitHub repository). For example, the integrated circuit design data structure may be transmitted 530 to an external device (e.g., a personal computing device) for display or storage. For example, the integrated circuit design data structure may be transmitted 530 to a client device (e.g., the front-end team client device 120, the back-end team client device 122, the packaging team client device 124, or the board team client device 126) for display or storage. For example, the integrated circuit design data structure may be stored 530 in memory (e.g., the memory 306). For example, the integrated circuit design data structure may be displayed 530 in a user interface (e.g., the user interface 320). For example, the integrated circuit design data structure may be transmitted 530 via a network communications interface (e.g., the network communications interface 318).

The process 500 includes, based on the integrated design data structure, generating 540 a package design data structure that encodes a design for a package substrate including an interposer that connects to the bumps. For example, the interposer may connect the bumps to respective pads with solder balls of a ball grid array (BGA) package. For example, the interposer may connect the bumps to respective pins of a dual in-line package (DIP) or quad flat package (QFP). By resolving the dependencies of the package design on the integrated circuit and specifically the dependencies on the pad ring, the integrated design data structure may enable package design processes to proceed in parallel with the design of additional logic circuits that will ultimately replace the placeholder. For example, the package design data structure may be generated 540 using one or more computer aided design tools running a client device (e.g., the packaging team client device 124).

The process 500 includes, based on the integrated design data structure, generating 550 a board design data structure that encodes a design for a circuit board that interfaces to integrated circuit, including the pad ring, via the package substrate. For example, the circuit board may be a printed circuit board (PCB), which may be made of various non-conducting materials (e.g., FR4 glass epoxy, Teflon, Kapton, or polyimide) with conducting features (e.g., copper pads, traces, and vias). By resolving the dependencies of the board design on the integrated circuit and specifically the dependencies on the pad ring, the integrated design data structure may enable a board design processes to proceed in parallel with the design of additional logic circuits that will ultimately replace the placeholder. For example, the board design data structure may be generated 550 using one or more computer aided design tools (e.g., Eagle) running a client device (e.g., the board team client device 126).

The process 500 includes, based on the pad ring configuration data structure and a register transfer level data structure describing additional logic circuits, generating 560 a second integrated circuit design data structure that encodes a physical design for a second integrated circuit that includes the pad ring with the bumps satisfying the rules for inputs and outputs of the integrated circuit and the additional logic circuits that use the connections to the one or more input drivers of the pad ring and to the one or more output drivers of the pad ring. The second integrated circuit design data structure may include a chip-level register-transfer logic (RTL) module including the pad ring (e.g., a chip wrapper). In some implementations, the second integrated circuit design data structure (e.g., including a register-transfer level file) may be generated 560 based on the pad ring configuration data structure and the register transfer level data structure describing additional logic circuits using tools, such as Scala, Chisel, Diplomacy, and/or FIRRTL. For example, generating 560 the second integrated circuit design data structure for the second integrated circuit may include executing Scala code to read design parameters from the pad ring configuration data structure and/or libraries referenced therein and dynamically generate a circuit graph. In some implementations, generating 560 the second integrated circuit design data structure for the second integrated circuit includes invoking a Diplomacy package in Chisel to determine a bus protocol for the second integrated circuit. In some implementations, the second integrated circuit design data structure encodes the second integrated circuit including standard interface circuits (e.g., USB, DDR, PCI bus, HDMI, or Ethernet) sometimes called PHY blocks or mixed signal IPs. For example, the second integrated circuit may include a PHY block connected to one or more of the bumps. The PHY block may be identified by the pad ring configuration data structure. In some implementations, the second integrated circuit design data structure (e.g., including a register-transfer level file) may be generated 560 based on the integrated circuit design data structure, which in turn is based on the pad ring configuration data structure, and the register transfer level data structure describing additional logic circuits using these or similar electronic design automation (EDA) tools.

The second integrated circuit design data structure includes a register-transfer level data structure for the second integrated circuit. The second integrated circuit design data structure may include a place and route data structure for the second integrated circuit. The second integrated circuit design data structure may include a bump coordinate file for the second integrated circuit. The second integrated circuit design data structure may include input/output pad constraint files for the second integrated circuit. For example, the second integrated circuit design data structure may be the integrated circuit design data structure 210 of FIG. 2.

The process 500 includes fabricating 570 an integrated circuit in a package based on the package design data structure and the second integrated circuit design data structure. In some implementations, fabricating 570 the integrated circuit in a package design may comprise invoking automated manufacture if the second integrated circuit at a remote manufacturing facility. For example, fabrication may be invoked by sending (e.g., via communications over the network 116) a physical design data structure (e.g., a GDSII file), which is a portion of the second integrated circuit design data structure, to a server of an integrated circuit manufacturing facility. In some implementations (not shown in FIG. 1), integrated circuit fabrication equipment used to fabricate the integrated circuit may be included in the system 100.

Figure 6:
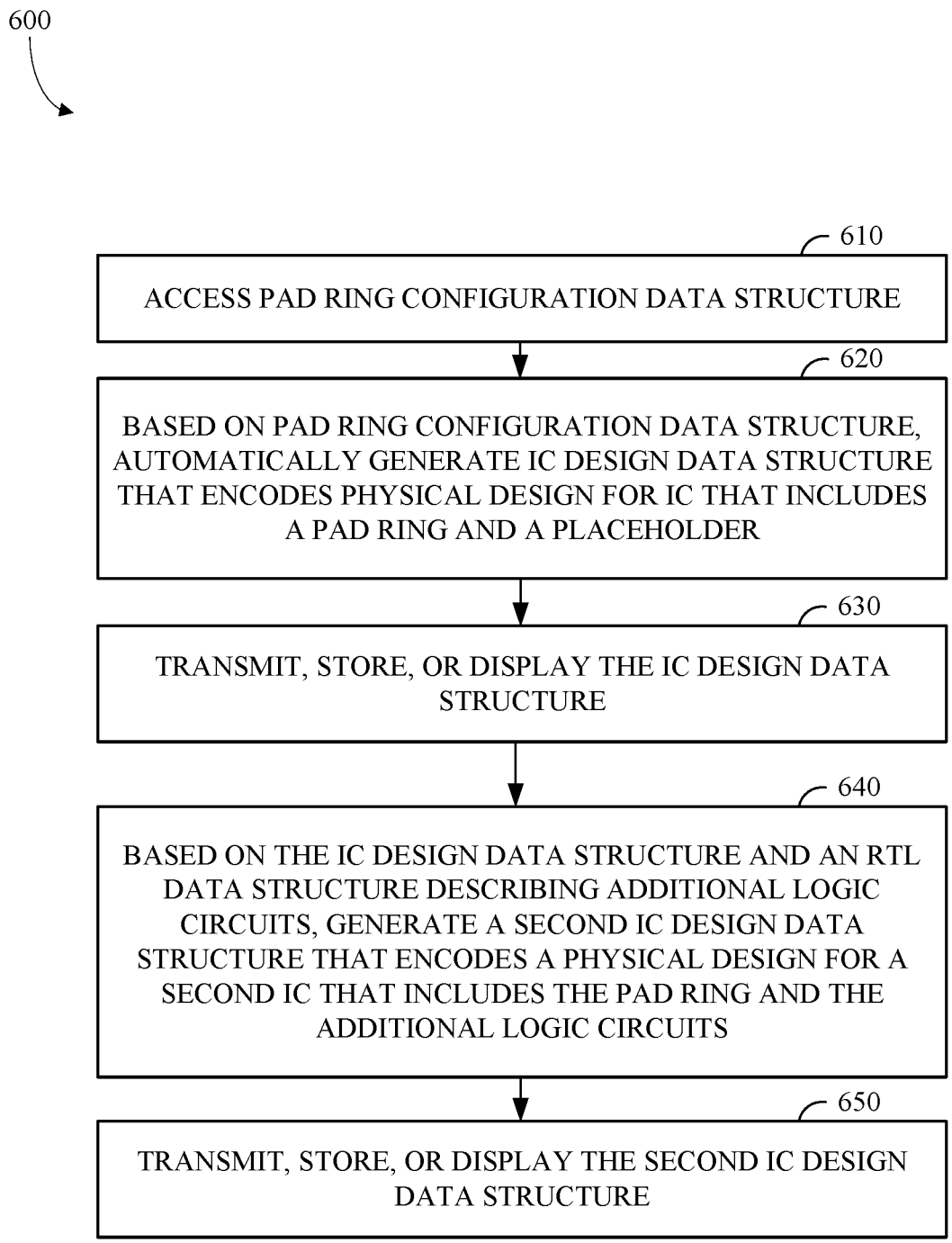
FIG. 6 is a flow chart of an example of a process for facilitating design of an integrated circuit including a pad ring.

FIG. 6 is a flow chart of an example of a process 600 for facilitating design of an integrated circuit including a pad ring. The process 600 includes accessing 610 a pad ring configuration data structure; based on the pad ring configuration data structure, automatically generating 620 a first integrated circuit design data structure that encodes a physical design for a first integrated circuit that includes a pad ring with bumps satisfying the rules for inputs and outputs of the first integrated circuit and also includes a placeholder for additional logic circuits; transmitting, storing, or displaying 630 the first integrated circuit design data structure; based on the first integrated circuit design data structure and a register transfer level data structure describing additional logic circuits, generating 640 a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring; and transmitting, storing, or displaying 650 the second integrated circuit design data structure. For example, the process 600 may be implemented using the pad ring design system 110 of FIG. 1. For example, the process 600 may be implemented using the system 300 of FIG. 3.

The process 600 includes accessing 610 a pad ring configuration data structure (e.g., a file, a database, a repository, or a bitstream). The pad ring configuration data structure declares rules for inputs and outputs of an integrated circuit using a scripting language. In some implementations, the pad ring configuration data structure is encoded in a tool control language (e.g., the Tcl scripting language). For example, the pad ring configuration data structure may include the code of Appendix A. For example, the pad ring configuration data structure may be accessed 610 by receiving the pad ring configuration data structure (e.g., via network communications with a client device, such as the front-end team client device 120 or the back-end team client device 122, using the network communications interface 318). For example, the pad ring configuration data structure may be accessed 610 by reading the pad ring configuration data structure (e.g., reading from the memory 306 via the bus 304).

The process 600 includes, based on the pad ring configuration data structure, automatically generating 620 a first integrated circuit design data structure that encodes a physical design for the first integrated circuit that includes a pad ring with bumps satisfying the rules for inputs and outputs of the first integrated circuit and also includes a placeholder for additional logic circuits. The placeholder includes connections to one or more input drivers of the pad ring and to one or more output drivers of the pad ring. In some implementations, the pad ring includes a redistribution layer that connects the bumps to the one or more input drivers of the pad ring and to the one or more output drivers of the pad ring. The first integrated circuit design data structure may include a chip-level register-transfer logic (RTL) module including the pad ring (e.g., a chip wrapper). For example, the pad ring may include i/o drivers (e.g., buffers or repeaters), bumps (e.g., C4 (controlled-collapse chip connection)), a redistribution layer (RDL) connecting the bumps to the i/o drivers, and/or electrostatic discharge (ESD) diode clamps. In some implementations, the first integrated circuit design data structure (e.g., including a register-transfer level file) may be automatically generated 620 based on the pad ring configuration data structure using tools, such as Scala, Chisel, Diplomacy, and/or FIRRTL. For example, generating 620 the first integrated circuit design data structure for the first integrated circuit may include executing Scala code to read design parameters from the pad ring configuration data structure and/or libraries referenced therein and dynamically generate a circuit graph. In some implementations, generating 620 the first integrated circuit design data structure for the first integrated circuit includes invoking a Diplomacy package in Chisel to determine a bus protocol for the first integrated circuit. In some implementations, the first integrated circuit design data structure encodes an integrated circuit including standard interface circuits (e.g., USB, DDR, PCI bus, HDMI, or Ethernet) sometimes called PHY blocks or mixed signal IPs. For example, the first integrated circuit may include a PHY block connected to one or more of the bumps. The PHY block may be identified by the pad ring configuration data structure.

The first integrated circuit design data structure includes a register-transfer level data structure for the first integrated circuit. The first integrated circuit design data structure may include a place and route data structure for the first integrated circuit. The first integrated circuit design data structure may include a bump coordinate file for the first integrated circuit. The first integrated circuit design data structure may include input/output pad constraint files for the first integrated circuit. For example, the first integrated circuit design data structure may be the integrated circuit design data structure 210 of FIG. 2.

The first integrated circuit design data structure may encode a logical design of the first integrated circuit (e.g., including one or more register-transfer logic files) and/or a physical design of the first integrated circuit (e.g., including one or more GDSII files). In some implementations, the first integrated circuit design data structure may be presented in one more views tailored to a type of user (e.g., a front-end team user, a back-end team user, or a package team user), such as in a logical view of the integrated circuit design and/or a physical view of the integrated circuit design. For example, the process 700 of FIG. 7 may be implemented to present views of the first integrated circuit design data structure.

The process 600 includes transmitting, storing, or displaying 630 the first integrated circuit design data structure. For example, the first integrated circuit design data structure may be a collection of files, an archive, or a repository (e.g., a GitHub repository). For example, the first integrated circuit design data structure may be transmitted 630 to an external device (e.g., a personal computing device) for display or storage. For example, the first integrated circuit design data structure may be transmitted 630 to a client device (e.g., the front-end team client device 120, the back-end team client device 122, the packaging team client device 124, or the board team client device 126) for display or storage. For example, the first integrated circuit design data structure may be stored 630 in memory (e.g., the memory 306). For example, the first integrated circuit design data structure may be displayed 630 in a user interface (e.g., the user interface 320). For example, the first integrated circuit design data structure may be transmitted 630 via a network communications interface (e.g., the network communications interface 318).

The process 600 includes, based on the first integrated circuit design data structure and a register transfer level data structure describing additional logic circuits, generating 640 a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring. The second integrated circuit design data structure may include a chip-level register-transfer logic (RTL) module including the pad ring (e.g., a chip wrapper). In some implementations, the second integrated circuit design data structure (e.g., including a register-transfer level file) may be generated 640 based on the pad ring configuration data structure and the register transfer level data structure describing additional logic circuits using tools, such as Scala, Chisel, Diplomacy, and/or FIRRTL. For example, generating 640 the second integrated circuit design data structure for the second integrated circuit may include executing Scala code to read design parameters from the pad ring configuration data structure and/or libraries referenced therein and dynamically generate a circuit graph. In some implementations, generating 640 the second integrated circuit design data structure for the second integrated circuit includes invoking a Diplomacy package in Chisel to determine a bus protocol for the second integrated circuit. In some implementations, the second integrated circuit design data structure encodes the second integrated circuit including standard interface circuits (e.g., USB, DDR, PCI bus, HDMI, or Ethernet) sometimes called PHY blocks or mixed signal IPs. For example, the second integrated circuit may include a PHY block connected to one or more of the bumps. The PHY block may be identified by the pad ring configuration data structure. In some implementations, the second integrated circuit design data structure (e.g., including a register-transfer level file) may be generated 640 based on the first integrated circuit design data structure, which in turn is based on the pad ring configuration data structure, and the register transfer level data structure describing additional logic circuits using these or similar electronic design automation (EDA) tools.

The second integrated circuit design data structure includes a register-transfer level data structure for the second integrated circuit. The second integrated circuit design data structure may include a place and route data structure for the second integrated circuit. The second integrated circuit design data structure may include a bump coordinate file for the second integrated circuit. The second integrated circuit design data structure may include input/output pad constraint files for the second integrated circuit. For example, the second integrated circuit design data structure may be the integrated circuit design data structure 210 of FIG. 2.

The process 600 includes transmitting, storing, or displaying 650 the second integrated circuit design data structure. For example, the second integrated circuit design data structure may be a collection of files, an archive, or a repository (e.g., a GitHub repository). For example, the second integrated circuit design data structure may be transmitted 650 to an external device (e.g., a personal computing device) for display or storage. For example, the second integrated circuit design data structure may be transmitted 650 to a client device (e.g., the front-end team client device 120, the back-end team client device 122, the packaging team client device 124, or the board team client device 126) for display or storage. For example, the second integrated circuit design data structure may be stored 650 in memory (e.g., the memory 306). For example, the second integrated circuit design data structure may be displayed 650 in a user interface (e.g., the user interface 320). For example, the second integrated circuit design data structure may be transmitted 650 via a network communications interface (e.g., the network communications interface 318).

Figure 7:
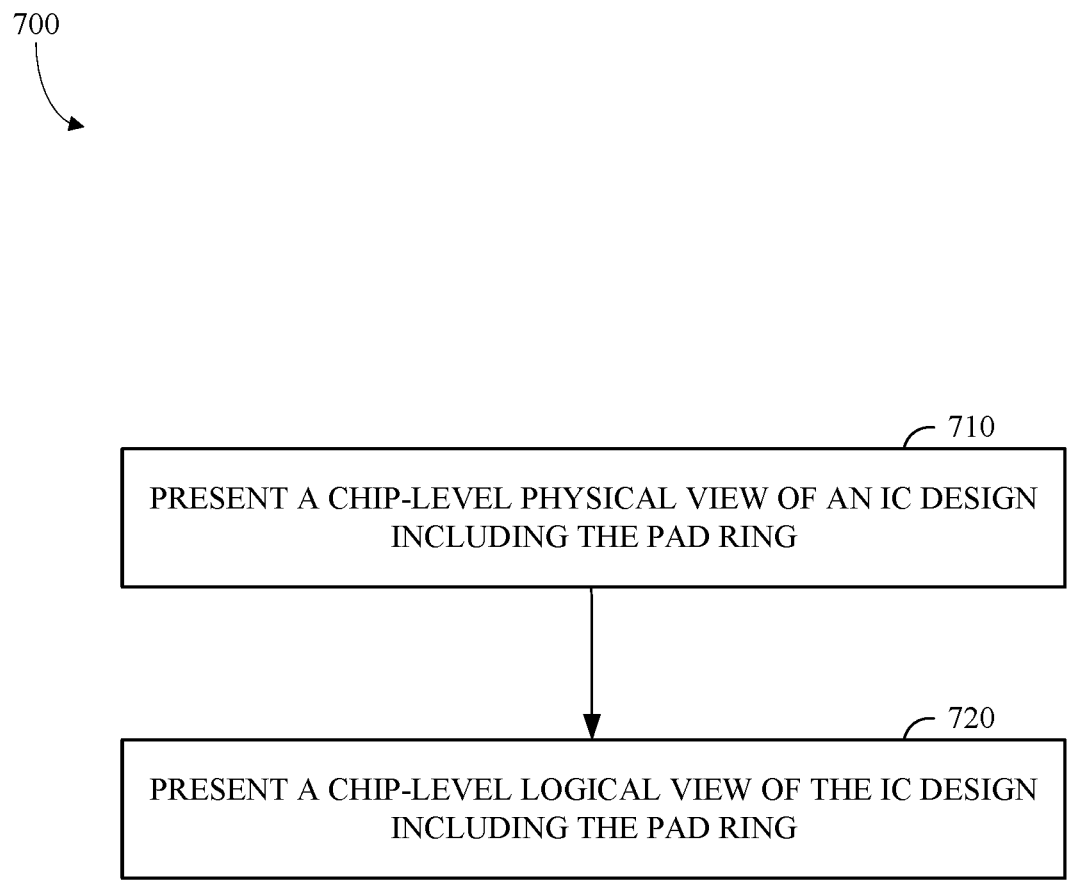
FIG. 7 is flow chart of an example of a process for presenting multiple chip-level views of an integrated circuit design including a pad ring.

FIG. 7 is flow chart of an example of a process 700 for presenting multiple chip-level views of an integrated circuit design including a pad ring. The integrated circuit design data structure encodes a logical design of the integrated circuit, in addition to the physical design of the integrated circuit. The process 700 includes presenting 710 a chip-level physical view of an integrated circuit design including the pad ring; and presenting 720 a chip-level logical view of the integrated circuit design including the pad ring. For example, the process 600 may be implemented using the pad ring design system 110 of FIG. 1. For example, the process 600 may be implemented using the system 300 of FIG. 3.

The process 700 includes presenting 710 a chip-level physical view of an integrated circuit design including the pad ring. For example, the chip-level physical view may be particularly useful to a backend team user. In some implementations, the chip-level physical view is presented 710 by transmitting data encoding a user interface including the chip-level physical view to a client device (e.g., the back-end team client device 122 or the packaging team client device 124) for display. For example, the chip-level physical view may be presented as part of a graphical user interface and/or as a collection of files (e.g., including GDSII files). For example, the pad ring may be presented as a set of bumps (e.g., physical ports) connected to pads (e.g., input/output pads and power pads) that are in turn connected to core logic circuitry, which may include a placeholder. For example, the integrated circuit design data structure may be presented 710 using a network communications interface (e.g., the network communications interface 318).

The process 700 includes presenting 720 a chip-level logical view of the integrated circuit design including the pad ring. For example, the chip-level physical view may be particularly useful to a front-end team user. In some implementations, the chip-level logical view is presented 720 by transmitting data encoding a user interface including the chip-level logical view to a client device (e.g., the front-end team client device 120) for display. For example, the chip-level logical view may be presented as part of a graphical user interface and/or as a collection of files (e.g., including RTL files). For example, the pad ring may be presented as a set of logical ports connected to logical pins of core logic circuitry, which may include a placeholder. For example, the integrated circuit design data structure may be presented 720 using a network communications interface (e.g., the network communications interface 318).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

APPENDIX A

```
# create_io_ring [options]

# Where options are:

# --name           : name of ioring
# --type           : either wirebond or flipchip
# --default_pitch  : pitch of IO cell placement (spreads IO cells evenly if not specified)
# --ring_count     : number of IO rings
# --placement_pitch : placement pitch of IO cells (i.e. width of smallest filler)
#-----------------------------------------------------------
# Width must be multiples of bump pitch (180)
set chip_width 12060
# Veight must be multiples of bump pitch (180)
set chip_height 5580
# create io ring
create_io_ring \
    --name almond_padring \
    --type flipchip \
    --chip_size "$chip_width $chip_height"\
    --placement_pitch 0.005
# create core
create_core_area \
    --name core_area \
    --bbox "170 170 [expr $chip_width - 170] [expr $chip_height - 170]" \
    --site {unit 0.140 1.2}
# Source process specific setup
source input/tsmc_cln28hpc.tcl
#-----------------------------------------------------------
# Read config for DDR and PCIe
#-----------------------------------------------------------
source input/ddr.tcl
source input/pcie.tcl
#-----------------------------------------------------------
# Add corner cells
#-----------------------------------------------------------
create_corner_cell \
    --name PNCV_CORNER_1UL \
    --libcell PCORNERE_G \
    --corner ul
#-----------------------------------------------------------
# add_pad <signal> [options]

# Where options are:

# --config         : name of config to use (uses config from set_default_config if not specified)
# --offset         : offset distance value to use (defaults to default_pitch in create_io_ring command)
# --min_left_iospace  : minimum space to left of IO cell
# --min_right_iospace : minimum space to right of IO cell
# --bondpad        : bondpad to use (uses bondpad from set_default_bondpad if not specified)
#-----------------------------------------------------------
#-----------------------------------------------------------
# pad order
#-----------------------------------------------------------
# NOTE: pad order is anti-clockwise starting at the top-left corner
```

APPENDIX A-continued

```
# current_ring_number auto
#----------------------------------------------------------
# left side
#----------------------------------------------------------
# set default pad config
set_default_config gpio
# config left side
add_pad_side left \
    --order top_to_bottom \
    --top_offset 110 \
    --bottom_offset 2960
add_pad ENDCAP_L1 --config endcap --no_bump --orientation E
add_pad IVDDT --config poc_T --no_bump
add_io_pg_pad_pairs T
add_core_pg_pad_pairs
add_io_pg_pad_pairs T
# PCIe
add_pad pcie_0_clkreq_n
add_pad pcie_0_perst_n
add_pad pcie_0_wake_n
# UPLI
add_pad ulpi_clk
add_io_pg_pad_pairs T
add_core_pg_pad_pairs
add_pad ulpi_rst
add_pad ulpi_dir
add_pad ulpi_nxt
add_pad ulpi_stp
add_io_pg_pad_pairs T
add_core pg_pad_pairs
add_pad ulpi_data_0
add_pad ulpi_data_1
add_pad ulpi_data_2
add_pad ulpi_data_3
add_io_pg_pad_pairs T
add_core pg_pad_pairs
add_pad ulpi_data_4
add_pad ulpi_data_5
add_pad ulpi_data_6
add_pad ulpi_data_7
add_pad ulpi_vbus
add_io_pg_pad_pairs T
add_core_pg_pad_pairs
# GemGxl
add_ pad gemgxl_0_col
add_pad gemgxl_0_crs
add_pad gemgxl_0_tx_clk
add_pad gemgxl_0_gtx_clk
add_io_pg_pad_pairs T
add_core_pg_pad_pairs
add_pad gemgxl_0_txd_0
add_pad gemgxl_0_txd_1
add_pad gemgxl_0_txd_2
add_pad gemgxl_0_txd_3
add_io_pg_pad_pairs T
add_core_pg_pad_pairs
add_pad gemgxl_0_txd_4
add_pad gemgxl_0_txd_5
add_pad gemgxl_0_txd_6
add_pad gemgxl_0_txd_7
add_io_pg_pad_pairs_T
add_core_pg_pad_pairs
add_pad gemgxl_0_tx_en
add_pad gemgxl_0_tx_er
add_pad gemgxl_0_rx_clk
add_pad gemgxl_0_rxd_0
add_core pg_pad_pairs
add_io_pg_pad_pairs T
#----------------------------------------------------------
# top side
#----------------------------------------------------------
# set default pad config
set_default_config gpio
# config top side
add_pad_side top \
    --order left_to_right \
    --bottom_offset 110 \
    --top_offset 3850
add_io_pg_pad_pairs T
add_core_pg_pad_pairs
add_pad gemgxl_0_rxd_1
add_pad gemgxl_0_rxd_2
add_pad gemgxl_0_rxd_3
add_pad gemgxl_0_rxd_4
add_io_pg_pad_pairs T
add_core_pg_pad_pairs
add_pad gemgxl_0_rxd_5
add_pad gemgxl_0_rxd_6
add_pad gemgxl_0_rxd_7
add_pad gemgxl_0_rx_dv
add_io_pg_pad_pairs T
add_core_pg_pad_pairs
add_pad gemgxl_0_rx_er
add_pad gemgxl_0_mdc
add_pad gemgxl_0_mdio
# GPIO
add_io_pg_pad_pairs T
add_core_pg_pad_pairs
add_pad gpio_0_pins_0
add_pad gpio_0_pins_1
add_pad gpio_0_pins_2
add_pad gpio_0_pins_3
add_io_pg_pad_pairs T
add_core_pg_pad_pairs
add_pad gpio_0_pins_4
add_pad gpio_0_pins_5
add_pad gpio_0_pins_6
add_pad gpio_0_pins_7
add_io_pg_pad_pairs T
add_core_pg_pad_pairs
add_pad gpio_0_pins_8
add_pad gpio_0_pins_9
add_pad gpio_0_pins_10
add_pad gpio_0_pins_11
add_io_pg_pad_pairs T
add_core_pg_pad_pairs
add_pad gpio_0_pins_12
add_pad gpio_0_pins_13
add_pad gpio_0_pins_14
add_pad gpio_0_pins_15
add_io_pg_pad_pairs T
add_core_pg_pad_pairs
# OTP
add_pad OTP_IVDD   --config OIVDD
# PRCI
add_pad prci_hfxclkin
add_pad prci_hfxsel
add_pad prci_coreclkpllsel
add_pad prci_rtcxaltclkin
add_io_pg_pad_pairs T
add_core_pg_pad_pairs
add_pad prci_rtcxsel
add_pad prci_tlclksel
add_pad prci_ereset_n
add_io_pg_pad_pairs T
add_core_pg_pad_pairs
add_pad prci_poreset_n
add_pad prci_procmon
add_pad prci_psd_reseten_n
add_io_pg_pad_pairs T
add_pad prci_psd_asyncreset_n
add_pad prci_psd_test_mode
add_pad prci_psd_test_mode_reset
add_io_pg_pad_pairs T
add_core_pg_pad_pairs
add_pad xtal --config xtal
add_pad boot_mode_select_0
add_pad boot_mode_select_1
add_io_pg_pad_pairs T
add_core_pg_pad_pairs
add_pad boot_mode_select_2
add_pad boot_mode_select_3
add_pad chip_id_select_0
add_io_pg_pad_pairs T
foreach pll [list core_pll dvfs_core_pll ddr_pll gemgxl_pll hfpclk_pll] {
    add_pad $pll \
        --config pll \
        --existing_instance
CLN28HPCPlatform/system/prci/$pll/ABJWTBJ5
```

APPENDIX A-continued

```
        add_io_pg_pad_pairs T
        add_core_pg_pad_pairs
}
# UART
add_pad uart_0_rxd
add_pad uart_0_txd
add_pad uart_1_rxd
add_pad uart_1_txd
# I2C
add_io_pg_pad_pairs T
add_core_pg_pad_pairs
add_pad i2c_0_scl
add_pad i2c_0_sda
add_pad i2c_1_scl
add_pad i2c_1_sda
# SPI
add_io_pg_pad_pairs T
add_core_pg_pad_pairs
add_pad spi_0_sck
add_pad spi_0_dq_0
add_pad spi_0_dq_1
add_pad spi_0_dq_2
add_io_pg_pad_pairs T
add_core_pg_pad_pairs
add_pad spi_0_dq_3
add_pad spi_0_cs_0
# QSPI
add_pad qspi_1_sck
add_pad qspi_1_dq_0
add_io_pg_pad_pairs T
add_core_pg_pad_pairs
add_pad qspi_1_dq_1
add_pad qspi_1_dq_2
add_pad qspi_1_dq_3
add_pad qspi_1_cs_0
add_io_pg_pad_pairs T
add_core_pg_pad_pairs
add_pad qspi_1_cs_1
add_pad qspi_0_sck
add_pad qspi_0_dq_0
add_pad qspi_0_dq_1
add_io_pg_pad_pairs T
add_core_pg_pad_pairs
add_pad qspi_0_dq_2
add_pad qspi_0_dq_3
add_pad qspi_0_cs_0
# PWM
add_pad pwm_1_pwm_0
add_io_pg_pad_pairs T
add_core_pg_pad_pairs
add_pad pwm_1_pwm_1
add_pad pwm_1_pwm_2
add_pad pwm_1_pwm_3
add_pad pwm_0_pwm_0
add_io_pg_pad_pairs T
add_core_pg_pad_pairs
add_pad pwm_0_pwm_1
add_pad pwm_0_pwm_2
add_pad pwm_0_pwm_3
# JTAG
add_pad jtag_TCK
add_io_pg_pad_pairs T
add_core_pg_pad_pairs
add_pad jtag_TMS
add_pad jtag_TDI
add_pad jtag_TDO
# Thermal Diode
add_pad PRCUTEA --config prcutea --no_bump
add_aio_pg_pad_triplets
add_pad thermaldiode_anode --config aio
add_aio_pg_pad_triplets
add_pad thermaldiode_cathode --config aio
add_aio_pg_pad_triplets
add_pad ENDCAP_T2 --config endcapa --no_bump --orientation FS
#---------------------------------------------------------
# right side
#---------------------------------------------------------
# set default pad config
set_default_config gpio
# config right side
    add_pad_side right \
        --order bottom_to_top
# DDR is placed to exactly line up with the existing bump layout
add_pad ddr --config ddr \
    --existing_instance
CLN28HPCPlatform/system/cadenceDDR4/tlCadenceDDR4Subsystem \
    --fixed "8159.965 44.970 S"
#---------------------------------------------------------
# Bottom side
#---------------------------------------------------------
# set default pad config
set_default_config gpio
# config bottom side
add_pad_side bottom \
    --order left_to_right \
    --bottom_offset [expr 3633 − 0.575] \
    --top_offset [expr 3995 − 0.725 + 8.135]
# PCIe
add_pad pcie --config pcie \
    --existing_instance
CLN28HPCPlatform/system/synopsysdwcpciedm_0/pcieaxisubsystem \
    --fixed "281.25 0 FN"
# Chiplink
add_pad ENDCAP_B1 --config endcap --no_bump --orientation FN
add_pad chiplink_0_b2c_clk
add_core_pg_pad_pairs
add_io_pg_pad_pairs B
add_pad chiplink_0_b2c_data_0
add_pad chiplink_0_b2c_data_1
add_pad chiplink_0_b2c_data_2
add_pad chiplink_0_b2c_data_3
add_io_pg_pad_pairs B
add_core_pg_pad_pairs
add_pad chiplink_0_b2c_data_4
add_pad chiplink_0_b2c_data_5
add_pad chiplink_0_b2c_data_6
add_pad chiplink_0_b2c_data_7
add_io_pg_pad_pairs B
add_core_pg_pad_pairs
add_pad chiplink_0_b2c_data_8
add_pad chiplink_0_b2c_data_9
add_pad chiplink_0_b2c_data_10
add_pad chiplink_0_b2c_data_11
add_io_pg_pad_pairs B
add_core_pg_pad_pairs
add_pad chiplink_0_b2c_data_12
add_pad chiplink_0_b2c_data_13
add_pad chiplink_0_b2c_data_14
add_pad chiplink_0_b2c_data_15
add_io_pg_pad_pairs B
add_core_pg_pad_pairs
add_pad chiplink_0_b2c_data_16
add_pad chiplink_0_b2c_data_17
add_pad chiplink_0_b2c_data_18
add_pad chiplink_0_b2c_data_19
add_io_pg_pad_pairs B
add_pad chiplink_0_b2c_data_20
add_pad chiplink_0_b2c_data_21
add_pad chiplink_0_b2c_data_22
add_pad chiplink_0_b2c_data_23
add_io_pg_pad_pairs B
add_core_pg_pad_pairs
add_pad chiplink_0_b2c_data_24
add_pad chiplink_0_b2c_data_25
add_pad chiplink_0_b2c_data_26
add_pad chiplink_0_b2c_data_27
add_io_pg_pad_pairs B
add_core_pg_pad_pairs
add_pad chiplink_0_b2c_data_28
add_pad chiplink_0_b2c_data_29
add_pad chiplink_0_b2c_data_30
add_pad chiplink_0_b2c_data_31
add_io_pg_pad_pairs B
add_core_pg_pad_pairs
add_pad chiplink_0_b2c_rst
add_pad chiplink_0_b2c_send
add_pad chiplink_0_c2b_clk
add_pad chiplink_0_c2b_data_0
add_io_pg_pad_pairs B
add_core_pg_pad_pairs
```

APPENDIX A-continued

```
add_pad chiplink_0_c2b_data_1
add_pad chiplink_0_c2b_data_2
add_pad chiplink_0_c2b_data_3
add_pad chiplink_0_c2b_data_4
add_io_pg_pad_pairs B
add_core_pg_pad_pairs
add_pad chiplink_0_c2b_data_5
add_pad chiplink_0_c2b_data_6
add_pad chiplink_0_c2b_data_7
add_pad chiplink_0_c2b_data_8
add_io_pg_pad_pairs B
add_core_pg_pad_pairs
add_pad chiplink_0_c2b_data_9
add_pad chiplink_0_c2b_data_10
add_pad chiplink_0_c2b_data_11
add_pad chiplink_0_c2b_data_12
add_io_pg_pad_pairs B
add_core_pg_pad_pairs
add_pad chiplink_0_c2b_data_13
add_pad chiplink_0_c2b_data_14
add_pad chiplink_0_c2b_data_15
add_pad chiplink_0_c2b_data_16
add_io_pg_pad_pairs B
add_core_pg_pad_pairs
add_pad chiplink_0_c2b_data_17
add_pad chiplink_0_c2b_data_18
add_pad chiplink_0_c2b_data_19
add_pad chiplink_0_c2b_data_20
add_io_pg_pad_pairs B
add_core_pg_pad_pairs
add_pad chiplink_0_c2b_data_21
add_pad chiplink_0_c2b_data_22
add_pad chiplink_0_c2b_data_23
add_pad chiplink_0_c2b_data_24
add_io_pg_pad_pairs B
add_core_pg_pad_pairs
add_pad chiplink_0_c2b_data_25
add_pad chiplink_0_c2b_data_26
add_pad chiplink_0_c2b_data_27
add_pad chiplink_0_c2b_data_28
add_io_pg_pad_pairs B
add_core_pg_pad_pairs
add_pad chiplink_0_c2b_data_29
add_pad chiplink_0_c2b_data_30
add_pad chiplink_0_c2b_data_31
add_pad chiplink_0_c2b_rst
add_pad chiplink_0_c2b_send
add_io_pg_pad_pairs B
add_core_pg_pad_pairs
add_pad IVDDB --config poc_B --no_bump
add_pad ENDCAP_B2 --config endcap --no_bump
#---------------------------------------------------------
# create_bump_map [options]
#---------------------------------------------------------
# create bump map
create_bump_map \
    --config pad85apb_lf_bu \
    --size {67 30}\
    --offset {180 180}
# PCIe bump keepout
create_bump_keepout \
    --bbox {1 0 19 7}
# DDR bump keepout
create_bump_keepout \
    --bbox {51 0 65 29}
# Corner keepouts (for scribe line)
create_bump_keepout \
    --bbox {0 0 0 0}
create_bump_keepout \
    --bbox {0 29 0 29}
create_bump_keepout \
    --bbox {66 0 66 0}
create_bump_keepout \
    --bbox {66 29 66 29}
#---------------------------------------------------------
# manually assign bumps [options]
#---------------------------------------------------------
manually_assign_bumps {
    { thermaldiode_anode       43 29 }
    { thermaldiode_cathode     44 29 }
    { chiplink_0_c2b_data_30   42  0 }
    { gemgxl_0_rxd_1            1 29 }
    { gemgxl_0_rxd_0            0 28 }
    { chiplink_0_c2b_data_2    32  2 }
    { uart_1_rxd               29 28 }
    { uart_0_txd               29 27 }
    { chiplink_0_c2b_data_25   40  2 }
    { IVDDB                    35  2 }
    { IVDDB                    29  3 }
    { IVSST                     2 23 }
    { IVSSB                    43  2 }
}
#---------------------------------------------------------
# create_custom_bumps
#---------------------------------------------------------
set x [expr 281.25 + 1586.1]
set y 203.97
for {set i 0} {$i < 4 } {incr i }{
    create_custom_bumps [list \
        [list VSS $x $y]\
    ]
    set y [expr $y + 282.25]
}
#---------------------------------------------------------
# create_bump_power_region [options]
#---------------------------------------------------------
# Allow 5 deep for signal connections
create_bump_power_region core_vdd_vss \
    --signals {VDD VSS} \
    --bbox {4 4 51 25}
create_bump_power_region pcie_left_vdd_vss \
    --signals {VDD VSS} \
    --bbox {1 8 4 14}
create_bump_power_region ddr_bottom_vdd_vss \
    --signals {VDD VSS} \
    --bbox {45 0 51 4}
create_bump_power_region ddr_top_vdd_vss \
    --signals {VDD VSS} \
    --bbox {45 24 51 29}
create_bump_power_region core_vdd_vss \
    --signals {VDD VSS} \
    --bbox {0 0 51 29}
#---------------------------------------------------------
# create_padring_design [options]

# Where options are:

# --chip_module        : name of top-level chip name
# --platform_module    : name of platform-level module from VDL
# --platform_instance  : name of platform-level instance to
create

#---------------------------------------------------------
# create padring design
create_padring_design \
    --chip_module AlmondChip \
    --platform_module CLN28HPCPlatform \
    --platform_instance CLN28HPCPlatform
write_verilog output/AlmondChip.v
write_pad_physical_constraints
output/AlmondChip.pad_physical_constraints.tcl
write_pad_attributes output/AlmondChip.pad_attributes.tcl
write_json output/AlmondChip.pads.json
write_tcl output/AlmondChip.pads.tcl
write_def output/AlmondChip.pads.def
write_bump_map output/AlmondChip.bumps.tcl
write_bump_locations output/AlmondChip.bump_locations.txt
write_icc_bump_text AP output/AlmondChip.icc_bump_text.tcl
write_milkyway \
    --library output/AlmondChipMilkyway \
    --tech_file
/sifive/library/tsmc/cln28hpc/tsmc/TSMCHOME/digital/BackEnd/mil
kyway/tcbn28hpcbwp12t30p140_100a/techfiles/
VHV_0d5_0/tsmcn28_101
m7X2ZUTRDL.tf \
    --open_in_icc
```

APPENDIX A-continued

```
# exit if EXIT is 1
if { $EX1T } {
    exit
}
```

What is claimed is:

1. A method comprising:
accessing a pad ring configuration data structure, wherein the pad ring configuration data structure declares rules for inputs and outputs of an integrated circuit using a scripting language;
based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring;
transmitting, storing, or displaying the integrated circuit design data structure; and
based on the integrated design data structure, generating a package design data structure that encodes a design for a package substrate including an interposer that connects to the bumps.

2. The method of claim 1, wherein the integrated circuit design data structure is a first integrated circuit design data structure and the integrated circuit is a first integrated circuit, and comprising:
based on the first integrated circuit design data structure and a register transfer level data structure describing additional logic circuits, generating a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring.

3. The method of claim 1, wherein the integrated circuit design data structure is a first integrated circuit design data structure and the integrated circuit is a first integrated circuit, and comprising:
based on the pad ring configuration data structure and a register transfer level data structure describing additional logic circuits, generating a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring; and
fabricating an integrated circuit in a package based on the package design data structure and the second integrated circuit design data structure.

4. The method of claim 1, wherein the pad ring configuration data structure is encoded in a tool control language.

5. The method of claim 1, wherein the integrated circuit design data structure encodes a logical design of the integrated circuit, and comprising:
presenting a chip-level physical view of an integrated circuit design including the pad ring; and
presenting a chip-level logical view of the integrated circuit design including the pad ring.

6. The method of claim 1, wherein the integrated circuit includes a PHY block connected to one or more of the bumps, and wherein the PHY block is identified by the pad ring configuration data structure.

7. The method of claim 1, wherein the pad ring includes a redistribution layer that connects the bumps to the one or more input drivers of the pad ring and to the one or more output drivers of the pad ring.

8. The method of claim 1, wherein the integrated circuit design data structure includes a place and route data structure for the integrated circuit.

9. The method of claim 1, wherein the integrated circuit design data structure includes a bump coordinate file for the integrated circuit.

10. The method of claim 1, wherein the integrated circuit design data structure includes input/output pad constraint files for the integrated circuit.

11. The method of claim 1, wherein the integrated circuit design data structure includes a register-transfer level data structure for the integrated circuit.

12. A system comprising:
a memory; and
a processor, wherein the memory includes instructions executable by the processor to cause the system to:
access a pad ring configuration data structure, wherein the pad ring configuration data structure declares rules for inputs and outputs of an integrated circuit using a scripting language;
based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring; and
based on the integrated design data structure, generating a package design data structure that encodes a design for a package substrate including an interposer that connects to the bumps.

13. The system of claim 12, wherein the integrated circuit design data structure is a first integrated circuit design data structure and the integrated circuit is a first integrated circuit, and the memory includes instructions executable by the processor to cause the system to:
based on the first integrated circuit design data structure and a register transfer level data structure describing additional logic circuits, generate a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring.

14. The system of claim 12, wherein the pad ring configuration data structure is encoded in a tool control language.

15. The system of claim 12, wherein the integrated circuit design data structure encodes a logical design of the integrated circuit, and the memory includes instructions executable by the processor to cause the system to:

present a chip-level physical view of an integrated circuit design including the pad ring; and
present a chip-level logical view of the integrated circuit design including the pad ring.

16. The system of claim 12, wherein the integrated circuit includes a PHY block connected to one or more of the bumps, and wherein the PHY block is identified by the pad ring configuration data structure.

17. The system of claim 12, wherein the pad ring includes a redistribution layer that connects the bumps to the one or more input drivers of the pad ring and to the one or more output drivers of the pad ring.

18. A non-transitory computer-readable storage medium that includes instructions that, when executed by a processor, facilitate performance of operations comprising:
accessing a pad ring configuration data structure, wherein the pad ring configuration data structure declares rules for inputs and outputs of an integrated circuit using a scripting language;
based on the pad ring configuration data structure, automatically generating an integrated circuit design data structure that encodes a physical design for the integrated circuit that includes a pad ring with bumps satisfying the rules for inputs and outputs of the integrated circuit and also includes a placeholder for additional logic circuits, wherein the placeholder includes connections to one or more input drivers of the pad ring and to one or more output drivers of the pad ring;
transmitting, storing, or displaying the integrated circuit design data structure; and
based on the integrated design data structure, generating a package design data structure that encodes a design for a package substrate including an interposer that connects to the bumps.

19. The non-transitory computer-readable storage medium of claim 18, wherein the integrated circuit design data structure is a first integrated circuit design data structure and the integrated circuit is a first integrated circuit, and wherein the operations comprise:
based on the first integrated circuit design data structure and a register transfer level data structure describing additional logic circuits, generating a second integrated circuit design data structure that encodes a physical design for a second integrated circuit that includes the pad ring with the bumps satisfying the rules for inputs and outputs of the first integrated circuit and the additional logic circuits that use the connections to the one or more input drivers of the pad ring and to the one or more output drivers of the pad ring.

20. The non-transitory computer-readable storage medium of claim 18, wherein the integrated circuit design data structure encodes a logical design of the integrated circuit, and wherein the operations comprise:
presenting a chip-level physical view of an integrated circuit design including the pad ring; and
presenting a chip-level logical view of the integrated circuit design including the pad ring.

* * * * *